Nov. 8, 1932.  R. EVANS  1,887,403
VENTED STAMP MOLD
Filed Sept. 25, 1929
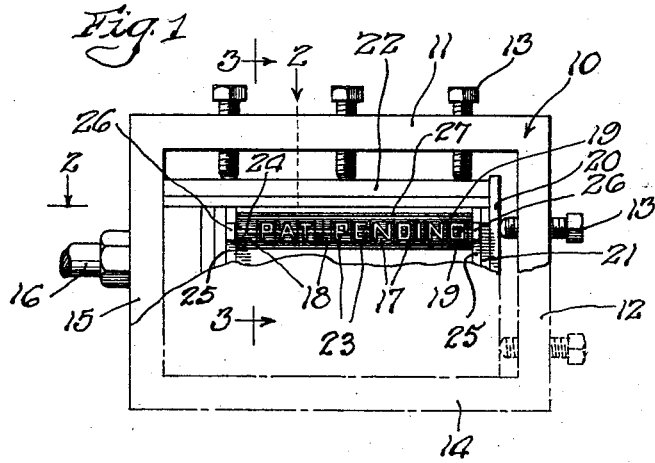
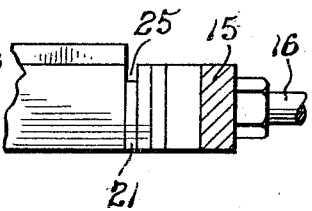
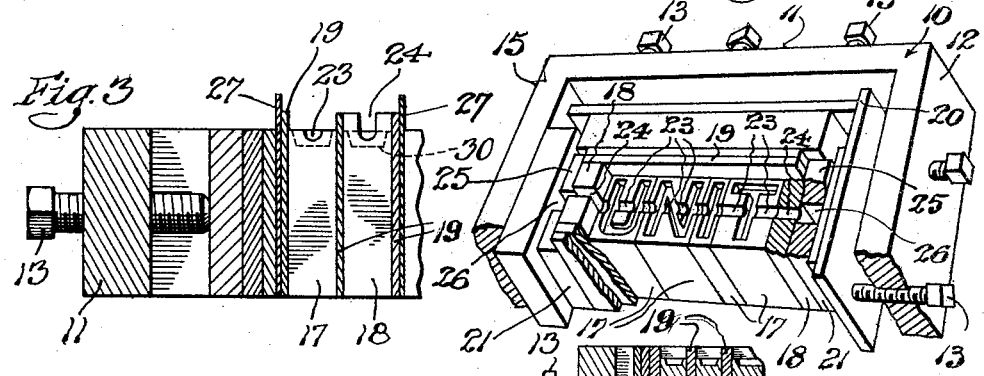
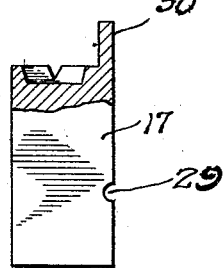
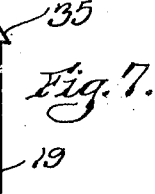
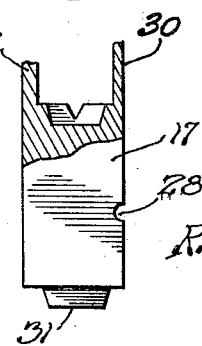
Richard Evans INVENTOR
BY Victor J. Evans
HIS ATTORNEY.

Patented Nov. 8, 1932

1,887,403

UNITED STATES PATENT OFFICE

RICHARD EVANS, OF HIGHLAND PARK, ILLINOIS

VENTED STAMP MOLD

Application filed September 25, 1929. Serial No. 395,157.

This invention relates to certain novel improvements in vented stamp molds and has for its principal object an improved arrangement and construction of parts which will greatly facilitate the making of rubber stamps, dies, or the like, and which will be simple and economical in use and manufacture.

It is an object of this invention to provide a vented intaglio character type body for making rubber stamps.

It is another object of the invention to provide a collapsible vented mold for making rubber stamps, and a mold that may be used repeatedly.

It is a further object of the invention to provide a vented type and a collapsible vented stamp mold to employ the vented type for making rubber stamps or dies without employing the clay mold heretofore employed in the art.

Another object of the invention is to provide an arrangement of parts which will enable the manufacture of rubber stamps or dies of varied heights and which arrangement is such that stamps or dies having the sides of the bases thereof tapered may be produced.

Another object of the invention is to provide an arrangement for properly aligning and planing the type bodies when the bodies are assembled in a frame.

A still further object of the invention is to provide an arrangement which will automatically cause the product made or vulcanized therein to be severed as desired.

Other objects will appear hereinafter.

The invention consists in the novel combination and arrangement of parts to be hereinafter described and claimed.

The invention will be best understood by reference to the accompanying drawing, showing the preferred form of construction and in which:

Fig. 1 is a top plan view of a preferred form of construction for my invention depicting the parts as assembled to carry out the vulcanizing operation;

Fig. 2 is a sectional view taken substantially on the line 2—2 on Fig. 1;

Fig. 3 is a sectional view taken substantially on the line 3—3 on Fig. 1;

Fig. 4 is a sectional view similar to Fig. 3 depicting a modified form of construction;

Figs. 5 and 6 are detail views of different forms of type bodies that may be employed in my device;

Fig. 7 is a detail view depicting one form of spacer embodied in the invention; and Fig. 8 is a perspective view showing a rubber stamp mold assembled with my vented type and spacing leads so as to illustrate the manner in which the air escapes from the mold during the molding operation.

In the accompanying drawing wherein I have illustrated a preferred form of construction for my invention, 10 generically indicates the clamping frame in which I arrange the type bodies and the co-operating parts to provide a mold. The clamping frame 10 includes sides 11 and 12 through which, in the present instance, bolt members 13 are extended that are employed as the clamping members. The sides 14 and 15, which are respectively arranged opposite the sides 11 and 12, are preferably made so as to be substantially flat to provide abutting surfaces. A suitable handle generically indicated by 16 is provided to facilitate handling of the frame 10.

A plurality of type bodies 17 are intended to be arranged in the frame 10 and spacers 18 are also provided which are intended to co-operate with the type bodies 17. The type bodies 17 may either embody individual sunken characters or may be groups of such characters forming pre-determined words or sentences as may be desired. In the embodiment of the invention illustrated the type bodies 17 embody individual sunken characters and are arranged to form the words Pat. pending in Fig. 1, spacers 18 being arranged between the word Pat. and the word pending, and it is to be understood that any number of spacers might be provided between these words dependent upon the spacing desired. Spacers are also arranged before and after the words for the purpose well understood in the art. It is also to be understood that the words can be letter spaced by placing a spacer between each letter. Spacers are also employed to fill out short words and sentences in order that the various lines of type, it being understood that a plurality of lines of type are intended to be arranged in the frame 10, shall all be of the same length in order to facilitate the clamping thereof in the frame 10. In Fig. 8 the spaces 18 are shown at the ends of the word "unit."

After the type bodies have been arranged in the clamping frame 10 in aligned relation to form words or sentences, spacing may be provided between these lines of type and this is accomplished by providing other spacers 19 which spacers 19 are known as leads or slugs. The various rows of type bodies and leads are arranged parallel to the sides 11 and 14. A sufficient number of rows of type bodies and leads or other spacing members are inserted to substantially fill the area between the sides 11 and 14. Arranged inside the frame 10 adjacent the side 12 is a strip 20 against which the bolts 13 in the side 12 are intended to bear. Another strip 21, of shorter length than the strip 20, is interposed between the ends of the rows of type bodies and leads and the strip 20. Another strip 22 is arranged to extend parallel to the rows of type bodies and leads and the bolts 13 in the wall 11 bear against this strip and it is, therefore, manifest that the bolts 13 will very effectively clamp the type bodies and spacers in the frame 10 to form the mold. When the device has been arranged in the manner set forth it is apparent that the sunken characters are in reality pockets or recesses filled with air.

To carry out a vulcanizing operation the device is rested on a flat surface and a sheet of unvulcanized rubber laid over the sunken faces of the type bodies of the assembled mold, which is then placed into a suitable press or vulcanizer and pressure applied on the rubber, which forces the rubber into the sunken characters and it is readily apparent that when the sheet of rubber covers these sunken characters, the air which naturally is within them would become sealed therein preventing the rubber from complete entering and properly filling the mold unless each individual sunken letter had been provided with vents, all co-operating with one another to provide avenues of escape for the entrapped air so that the rubber could completely fill in the characters and thus produce perfectly formed characters and, therefore, I provide in the walls of the characters notches or vents 23, through which the entrapped air can escape. To further assist this air to escape I provide vents 24 in the upper surfaces of the spacers 18 which communicate with the notches or vents 23. To allow the air to entirely escape from beneath the rubber I have arranged the strip 21 of less height than the surrounding material and as a consequence a groove or channel 25 through which the air can entirely escape is provided. The strips 21 which are disposed adjacent the ends of the rows of spacers and type bodies can be composed of a plurality of sections so that open spaces such as 26 will be provided. When the rubber is forced into the sunken characters the air passes out through the vents 23 and the vents 24 along the channel 25 and escapes through the openings 26. It is therefore manifest that the mold is very effectively vented, and, therefore, the rubber will completely fill all of the sunken characters of the mold. When the sunken characters have become filled heat may be applied to the rubber and the rubber will then become vulcanized after which it is pulled from the mold and the rubber which had been forced into the sunken characters will appear as raised and perfectly formed characters on the vulcanized rubber.

It is particularly to be understood that the lowest point of the vents 23 is positioned slightly above the sunken face of the character for the following reason, and it is also in this particular arrangement that this improved invention differs from the prior art, consequently obtaining new and advantageous results. If the lowest point of the vent came in contact with the face of the character as disclosed by the prior art such as in Hamilton Wood's patent U. S. No. 7,111, rubber when forced into the characters would not only fill the characters but in addition continue to go into the vent and therefore completely destroy the product, an elongated extension being formed on the face of each character making the whole product worthless.

To prevent this I provide vents 23 by removing a portion of one or more of the marginal walls of each sunken character, the lowest point of which vent is slightly higher than the sunken face of the character. When the rubber is placed upon the sunken letters and pressure applied, the rubber is forced into the letters and simultaneously the air is forced out through the vents. It is understood that the rubber also enters the vents, but it has been my experience, that all, or so much air has been eliminated from the sunken areas before the complete closing of the vents takes place, that perfect results are always obtained in a much quicker period than has heretofore been possible. The face of the characters, being slightly lower than the lowest point of the vent, causes the raised product to have very smooth faces with sharp and well defined outlines, and the rubber in the filled vent because of its higher position in the sunken characters, is now positioned below the face of the raised characters where it has no bearing on the printing qualities of the product. The rubber which has formed in the vents can easily be cut from the finished dies.

It is sometimes advantageous to produce letters of different heights and this is accomplished in the following manner. The leads 19 are arranged to extend above the upper surfaces of the type bodies 17 in the manner depicted in Fig. 3 and if desired the spacers 18 may be similarly extended and in this manner relatively deep pockets are defined which when the rubber is introduced thereinto produce correspondingly high letters. When desired the extended portion may be tapered in order to produce dies with tapered bases.

In order to facilitate separation of the various rows of letters or words, when desired, relatively thin spacers 27 may be provided which will have relatively sharp upper edges which will be extended beyond the upper edges of the leads 19, as is also clearly illustrated in Fig. 3, and these sharpened edges will extend between the rows of type and will, therefore, very effectively cause separation in the finished rubber product.

In the embodiment of the invention thus far described it is necessary that the frame, type bodies and spacers, be disposed on a substantially flat surface to bring about proper alignment or planing, for it is readily apparent that it is necessary, since the faces of the sunken characters must be properly aligned so that the faces of the characters on the rubber after having been vulcanized therein will all be of equal height. To secure this proper alignment by the construction thus far described is relatively difficult and I have, therefore, provided the type body construction depicted in Fig. 4. In this arrangement the type bodies have offset portions 28 which extend outwardly from the sides of the type bodies and the leads 19 may rest on these projecting portions 28 and, therefore, by properly aligning the upper surface of the leads 19 it is manifest that the type bodies will be very effectively aligned. The remaining portions of this construction are identical with that heretofore set forth.

In Fig. 5 a further modified form of construction for accomplishing this aligning is depicted. Herein the type body 17 is provided with a notch 28 through which a pin or the like may be extended, and in this manner the type will be aligned. In addition to the notch 29 the type body 17, illustrated in Fig. 5, also includes the upwardly extending lug 30 which serves the same utility as the upwardly extending leads 19 in the embodiment of the invention illustrated in Fig. 3. I have also found it advantageous to provide on the end of the type body 17 opposite that provided with the recessed type a raised letter 31 corresponding to the letter defined in the recess 30 which will facilitate the reading of the type set up in the mold.

In the embodiment of the invention illustrated in Fig. 6 the type body 17 is constructed in a manner substantially similar to that set forth in the description of the type body shown in Fig. 5 but in addition to that I provide an additional upstanding lug 32 which co-operates with the upstanding lug 30 to form the relatively deep rubber receiving well.

In Fig. 7 a further modified arrangement for accomplishing proper alignment is depicted. Herein the spacer 19 is provided at its upper end with an outwardly extending portion 35 providing a shoulder which shoulder would bear on the upper surfaces of the type bodies and, therefore, very effectively align them and if desired to such outstanding lugs might be provided so as to provide opposite shoulders which would manifestly align adjacent rows of type. The taper on the outwardly extending portion 35 would also cause a tapered base to be formed on the finished product.

In use the various parts are arranged in the frame 10 in the manner set forth. When clamped, they provide a mold which is then placed in a vulcanizer after a sheet of unvulcanized rubber has been placed thereover. Pressure is applied which causes the rubber to be forced into the sunken characters of the mold, air escapes through the vents and channels and the heat from the vulcanizer causes the rubber to be vulcanized after which it is pulled from the mold and it will bear a reverse reproduction of the characters of the mold.

From the foregoing description it is manifest that I have provided vented type bodies and spacers and a vented mold construction which will greatly facilitate the molding of rubber stamps since the invention provides for air escapement from the type bodies during the molding operation which has hitherto in the art been the cause of irregularly formed letters on rubber stamps made in any way other than by the use of clay molds, and it is to be noted that the successful functioning of the clay mold is due to the porous nature of the clay which permits entrapped air to escape during the molding operation. It is manifest that this device is arranged so that the mold may be very expeditiously set up and disassembled and reassembled in different forms. It is also apparent that the device may be employed to produce rubber stamps or dies of various heights, with tapered bases when desired.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. A vented stamp mold comprising a plurality of elements adjustably and attachably associated, a plurality of type bodies having sunken indicia arranged in rows by said elements, said type bodies having vents cooperating with each other to form channels in the upper surfaces thereof providing vents for the sunken indicia.

2. A vented stamp mold comprising a frame, adjustable members associated with said frame, a plurality of type bodies having sunken indicia in certain ends thereof, means carried by said frame for clamping said type bodies between said members in a position to form a channel between said members over said sunken indicia, said type bodies having vents cooperating with each other to form channels in the surface thereof providing vents for the sunken indicia.

3. A rubber stamp mold comprising type bodies each having an intaglio character recess formed therein; each of said bodies including a wall about the recess therein; each of said walls having vents formed therein, the inner ends of said vents being removed from the inner ends of said recesses, and means for assembling said type bodies to align the vents to form channels for conducting air out of said recesses during the stamp molding operation.

4. A vented stamp mold comprising a plurality of type having characters in intaglio therein, said type having vents in the walls defining said characters, spacing leads, said leads having vents therein co-operating in assembled position with the vents in said type to form channels to conduct the air out of said characters during the molding operation, and means for assembling said type and said leads.

5. A vented stamp mold comprising a plurality of type having characters in intaglio therein, said type having vents in the walls defining said characters, spacing leads, said leads having vents therein co-operating in assembled position with the vents in said type to form channels to conduct the air out of said characters during the molding operation, means arranged to conduct the air away from said channels during the molding operation, and means for assembling said type and said leads.

6. In the art of making stamps from plastic material, a type body having an intaglio character recess; said body including a wall about said recess having vents formed therein, the inner ends of said vents being removed from the inner end of said recess, and means associated with said vents providing channels communicating with said vents.

7. A rubber stamp mold comprising type bodies each having an intaglio character recess formed therein; each of said bodies including a wall about the recess therein; each of said walls having vents formed therein, the inner ends of said vents being removed from the inner ends of said recesses, spacing members provided with vents, and means for assembling said type bodies and spacing members to align said vents to form channels for conducting air out of said recesses during the stamp molding operation.

In testimony whereof I affix my signature.

RICHARD EVANS.